United States Patent Office 2,904,432
Patented Sept. 15, 1959

2,904,432

METHOD OF PRODUCING A PHOTOGRAPH IN GLASS

Howard G. Ross and Frederic W. Schuler, Corning, N.Y., assignors to Corning Glass Works, Corning, N.Y., a corporation of New York No Drawing. Application September 29, 1954
Serial No. 459,201

16 Claims. (Cl. 96—34)

This invention relates to the production of a permanent, two-dimensional, photographic image in glass.

Such an image heretofore has been produced by the method disclosed in the pending application Serial No. 324,415, filed December 5, 1952, by Stanley Donald Stookey, now Patent No. 2,732,298, which comprises forming on the surface of a silicate glass containing an alkali metal oxide a chemically fixed, photographic colloidal silver image, heating the glass together with the image in the presence of an oxidizing medium for a time sufficient to oxidize and ionize the silver and to cause migration of silver ions into the glass, and reducing the migrated silver ions to metallic particles while heating the glass in the presence of a reducing medium. The reduced silver particles produce a yellow to brown coloration known as a silver stain which forms a sharply delineated image in the surface of the glass.

In the prior method the photographic silver image initially present on the glass surface is produced in the conventional manner by the exposure and chemical development of an emulsion comprising a photosensitive silver halide dispersed in an organic medium. Such emulsion may be applied as a coating to the surface of the glass before its exposure and development or it may be transferred to the glass after its exposure and development, for example as "stripping film."

In utilizing such a photosensitive emulsion, however, it is difficult to maintain all parts of the silver image exactly in their original dimensional relationship with each other on account of a tendency for one portion of the image to change its position on the glass relative to another portion during the developmental manipulations and/or the burning-off of the organic material of the emulsion. Even a very minor stretching or contraction of the emulsion during its development or transfer or resulting from the burning of the organic material between the silver and the glass may result in a slight distortion of the image sufficient to render it unsuitable for articles requiring great dimensional accuracy such as reticles and scales.

Moreover, the prior method is dependent upon the photosensitivity of the silver halides and is limited to a final image comprising a silver stain. It therefore cannot be utilized to produce a similar image consisting of the equally well known copper stain, because no photosensitive compound of copper is known. A copper stain is desirable for some purposes, because it produces a different coloration than the silver stain.

It is an object of the present invention to provide a method by which a two-dimensional image consisting of either a silver stain or a copper stain or a combined silver and copper stain can be produced in glass with greater accuracy than was heretofore possible. The new method is independent of the photosensitivity of a salt of the metal used to produce the stain and the initial metallic image can be formed in intimate direct contact with the glass, wherefore its dimensional accuracy can readily be maintained.

Broadly the new method according to the invention comprises forming directly in contact with a silicate glass article containing an alkali metal oxide a continuous metallic film of silver or copper, or both silver and copper, in a pattern corresponding to the desired image heating the article in the presence of an oxidizing medium comprising air at a temperature and for a time sufficient to oxidize and ionize the metal image and to cause migration of the ions into the glass, and reducing the migrated ions to metallic particles while heating the article in the presence of a reducing medium.

Preferably the desired image is delineated in the metallic film by covering it with a coating of a photosensitive resist capable of being rendered insoluble by exposure to short wave radiations (less than 400 millimicrons), such as ultraviolet radiations, exposing a portion of such coating to said radiations in a pattern corresponding to the desired image to render such portion insoluble, dissolving and removing the unexposed portion of the coating to lay bare the metal film thereunder, and dissolving and removing the bared metal while leaving intact the metal underlying the insoluble portion of the coating, said residual coating being removed by oxidation and combustion when the glass is subsequently heated in the above described manner.

The new method is effective only in glasses containing an alkali metal oxide because the staining of glass by silver and copper depends upon the exchange of silver and copper ions in contact with the heated glass for alkali metal ions in the glass. Insofar as we know, the glass should be a silicate glass. The general composition of a suitable glass is not otherwise critical and any practicable silicate glass containing an alkali metal oxide may be utilized for carrying out the invention. Advantageously glasses of the soda-lime-silicate type such as those described in United States Patent No. 1,369,988 or of the low-expansion borosilicate type such as those described in United States Patent No. 1,304,623 may be used. It is immaterial whether or not the glass itself is photosensitive because the present method is independent of the photosensitivity of the glass. However, non-photosensitive glasses are preferred as being cheaper and less liable to develop undesired coloration.

The metallic film may be deposited on the glass by various known methods such as the chemical precipitation from a solution of a salt of the metal. One such method for silver, the Brashear method, is so well known and so widely published in texts relating to the production of silver mirrors as to need no discussion here.

A method for the deposition of a copper mirror is described in an article entitled "The Chemical Deposition of Copper Mirrors on Glass," by Marboe and Weyl, Glass Industry, vol. 26, page 119 (1945).

An alternative method of depositing a film of silver or copper on the glass is the well known method of evaporating the metal by heat in a vacuum and allowing the metal vapor to condense on the surface of the glass which is placed in the vicinity of the evaporator in the vacuum, as is described for example in Patent No. 2,413,605. A film containing both silver and copper may be formed, if desired, by thus evaporating one metal on to the glass and then evaporating the other metal over the first, or by evaporating a suitable alloy of both metals. A layer of one of the metals can also be formed by chemical deposition and a superimposed layer of the other can then be formed by evaporation. Superimposed layers can also be formed by electroplating by making the first deposited metal the cathode in a suitable electrolyte.

To delineate the desired image in the metallic film a coating of a photosensitive resist, referred to as a photoresist, is applied uniformly over the film. This usually comprises a soluble organic material or mixture of materials, which polymerizes and becomes insoluble when exposed to visible actinic or short wave radiations. By way of example the following are some well known photo-resists which are suitable for the present purpose:

Bichromated gelatin or fish glue, which is composed of either gelatin or fish glue and contains a photosensitive bichromate, is extensively used. It is initially soluble in water but becomes insoluble therein when exposed to ultraviolet radiations.

Bichromated albumin, composed of albumin and a photosensitive bichromate, is utilized in a similar manner but after exposure it should be coated with a greasy ink, such as printers ink, to render the exposed portion hydrophobic, the unexposed portion remaining unaffected and soluble in water.

Polyvinyl alcohol, which is inherently polymerizable by ultraviolet radiations, may be used without addition of a photosensitive element. Since it is water soluble before exposure, water may be used as the developer. It is susceptible to oxidation if exposed to the air more than momentarily.

Polyvinyl acetate, also polymerizes on exposure to ultraviolet radiations and the exposed portions can also be developed by water Oil of Judea, which is a mixture of asphalt and lavender oil, also polymerizes on exposure to ultraviolet radiations, but is developed by means of a light mineral oil as a developer.

A commonly used photo-resist comprises an organic monomer described in Patent No. 2,610,120, which is polymerizable by ultraviolet radiations. It is sold under the trade name "KPR" by the Eastman Company of Rochester, New York. Trichlorethylene is used as its developer.

The desired image is formed in the coating of photo-resist in the conventional manner by exposing the coating of photo-resist in the conventional manner by exposing the coating to a suitable source of short-wave radiations, such as a carbon or mercury arc, projected through a photographic transparency, preferably placed in contact with the photo-resist. Development of the image occurs when the photo-resist thereafter is treated with the appropriate solvent to dissolve and remove the unexposed or soluble portion thereof.

The type of image produced depends upon the photographic transparency employed. A fulltone image, such as a reticle, scale, line drawing, silhouette and the like, is produced by using a transparency made by photographing a drawing of the desired object. A half-tone image, such as a portrait or a landscape, is reproduced by using a conventional half-tone transparency made by photographing the subject or a reproduction thereof through a half-tone screen. A negative transparency produces a positive image in the photo-resist and also in the glass while a positive transparency produces a negative image.

By dissolving and removing the metal film from the glass wherever the overlying coating of the photo-resist has been removed a replica of the image is reproduced in the metal remaining in contact with the glass. For this purpose any dilute solvent of the metal, such as dilute nitric acid or a dilute solution of ferric nitrate, may be used provided it does not dissolve or objectionably react with the photo-resist.

After the image has thus been delineated in the metal, the glass article is heated at a temperature and for a time sufficient to oxidize and eliminate the residual photo-resist and to oxidize and ionize the metal image and cause migration of the ions into the glass. Such reactions occur at a practicable rate (from one to six hours) at temperatures having a minimum about 125° C. below the strain point of the glass. The reaction is more rapid at higher temperatures and requires only one to five minutes at the maximum temperature which should be sufficiently below the softening point of the glass to avoid distortion thereof. (As used herein, strain point means that temperature at which the viscosity of the glass is $10^{14.6}$ poises and softening point is that temperature at which the viscosity of the glass is $10^{7.6}$ poises.) While the minimum and maximum temperatures at which the reaction can occur vary with the strain point and the softening point of the glass, the practicable temperature will not be less than about 400° C. nor more than about 700° C.

The ion exchange or migration of the metal ions into the glass may advantageously be facilitated by applying to the glass and over the metal image a coating of an argillaceous material, such as preferably ocher, before heating it. The argillaceous material, which is more effective if finely divided, is applied as a paste or slurry with water or other vehicle such as an oil or volatile organic liquid. Such treatment is particularly effective if the metal comprises silver. When the metal is copper the argillaceous material is more effective if it contains a sulfide such as ferric or ferrous sulfide.

In lieu of an argillaceous coating, the presence of up to about 25% by volume of $SO_2$ in the air in contact with the glass and the metal, while they are being heated to cause oxidation and migration of the metal ions into the glass, facilitates or increases such ion migration for both silver and copper; larger proportions of $SO_2$ in the air lessen or prevent oxidation and migration of the metal ions. The beneficial effect of $SO_2$ is independent of the presence of the argillaceous coating but is not inhibited thereby.

The oxidation, ionization and ion migration, particularly of silver may further be increased by the presence in the reaction zone of one or more of the salts, ferric sulfate, ferrous sulfate or aluminum sulfate either alone or, as is referable, in admixture with the argillaceous material.

The migrated metal ions change the refractive index of the glass usually sufficiently to produce at least a faintly visible image, which in the case of silver is usually of a yellowish color due to spontaneous conversion or reduction of a small portion of the silver ions in the glass to metallic particles. In the case of copper the glass remains colorless until heated in the presence of a reducing medium unless the glass is a borosilicate, such as the low expansion borosilicate referred to above, in which case the glass is spontaneously colored yellow by the copper.

The complete reduction of the migrated metal ions and the resulting development of the maximum coloration of the image in the glass thereby (brown to black in the case of silver, red to black in the case of copper, and black when both are present) occurs when the glass is heated under reducing conditions, preferably in an atmosphere containing a reducing gas such as hydrogen, carbon monoxide, or methane. Advantageously this may comprise continuing the heating in the above recited temperature range after the migration of the metal ions into the glass has taken place and displacing the atmospheric air with the reducing gas.

Since the metal ions normally migrate into the glass a distance of only a few microns, the final image therein is substantially two-dimensional.

If desired, the steps of the above-described method may be carried out in a different sequence with substantially the same result. For this purpose the coating of the photo-resist is applied as the first step directly to the glass and an image is formed therein by exposure to short-wave radiations through a photographic transparency. In this case, however, the image in the photo-resist must be the reverse of the desired image and, if a positive image in the glass is desired, a negative image should be formed in the photo-resist. That is to say, a positive transparency is utilized to produce a positive image in the glass.

The image in the photo-resist is then developed by dissolving and removing the unexposed portion of the coating to lay bare the glass thereunder in a pattern corresponding to the desired final image while leaving the exposed portion of the coating on the glass in a pattern corresponding to the reversed image.

The thin metallic film of silver or copper or both silver and copper is then deposited uniformly on the bared glass and over the residual portion of the photo-resist and the glass is thereafter heated in the manner described above.

In such method the metal in contact with the bared glass forms the pattern of the desired image, but the metal over the residual portion of the photo-resist forms a reversed image which is not in contact with the glass. During the subsequent heating of the glass the metal which does not contact the glass is ineffective and the stained image is produced in the glass only by the metal which is in contact therewith.

*Example 1*

On one face of a plate of soda-lime-silicate glass approximately one foot square a silver mirror was formed by the conventional wet chemical process. A coating of a photo-resist comprising an ultraviolet-polymerizable organic monomer soluble in trichlorethylene was applied over the metal film and was exposed for approximately three minutes at a distance of about 1 foot to an 800 watt new quartz mercury arc through a negative photographic transparency made by photographing a line drawing depicting a scale. (After long use the ultraviolet emission of such an arc is decreased and a longer exposure, up to 30 minutes, may be required.) Following such exposure the glass plate was treated with trichlorethylene to dissolve the unexposed portion of the photo-resist and to lay bare the metal film beneath it. The exposed portion, representing the lines of the drawing and being insoluble, was undissolved. The plate with the developed image was then treated with a 10% aqueous solution of ferric nitrate which dissolved the bared silver within a few minutes leaving the portion of the silver film which was protected by the undissolved portion of the photo-resist.

A coating of a paste of ocher and water containing about 10% by weight of ferric sulfate was then applied and the glass plate was heated slowly in air to about 650° C. where it was held for about five minutes, after which it was heated in an atmosphere of 92% nitrogen and 8% hydrogen by volume and then cooled and the residual material was wiped off. An image of the line drawing remained as a permanent dark brown stain in the surface of the glass.

*Example 2*

A plate of soda-lime-silicate glass was provided with a thin film of copper by the conventional method of evaporating the metal and depositing it on the glass in a vacuum. A coating of the photo-resist utilized in Example 1 was applied over the copper film and an image was formed therein and developed as in Example 1. The area of the metal laid bare by such development of the image in the photo-resist was removed from the glass by treating the plate with a 15% aqueous solution of nitric acid leaving a copper replica of the original image beneath the insoluble residue of the photo-resist.

A paste of ocher and water containing about 5% each of finely divided ferrous sulfide and ferric sulfate was applied over such image and the glass plate was slowly heated in air in an electrically heated muffle to about 600° C. where it was held for about ten minutes. The atmosphere of the muffle was then displaced by a non-explosive mixture of 92% nitrogen and 8% hydrogen and heating at 600° C. was continued for twenty minutes. An image of a dark red color was thereby produced in the glass.

*Example 3*

A small plate of soda-lime-silicate glass was coated with a mixture of copper and silver by evaporating the metals simultaneously from individual molybdenum containers electrically heated in a vacuum and condensing the metal vapors together on the glass which was placed in the evacuated space near the evaporators. A coating of the photo-resist utilized in Example 1 was applied over the metal film and an image was formed therein by exposing the coating for about three minutes at a distance of about one foot to a quartz mercury arc through a negative photographic transparency and thereafter treating it with trichlorethylene to remove the unexposed portion and to lay bare the metal beneath, the bare portion of the metal being subsequently dissolved by dipping the plate into 15% aqueous nitric acid. The plate was then coated with ocher and heated as in Example 2. The positive image produced in the glass was practically black in color.

*Example 4*

A plate of soda-lime-silicate glass was provided with a uniform coating of the photo-resist utilized in Example 1 and an image was formed and developed therein by exposing the coating for about three minutes at a distance of one foot to a quartz mercury arc through a negative photographic transparency and thereafter treating it with trichlorethylene to remove the unexposed portion. In this case the bared area of the glass corresponded to the desired image.

A silver mirror was then deposited by the chemical process over the entire face of the plate, that is, over the residual photo-resist and over the bared portion of the glass representing the desired image. While the silver adhered well to the bared glass, it could easily be rubbed off from the photo-resist.

The surface of the plate was then covered with a paste of ocher and water containing about 10% by weight of ferric sulfate and the plate was heated slowly in air to about 600° C. where it was held for about ten minutes followed by about twenty minutes heating in a reducing atmosphere as in Example 2, after which it was cooled and the residual material was wiped off. The silver which was in contact with the bared portion of the glass formed therein a permanent dark-brown, two-dimensional, negative image but the silver overlying the exposed portion of the photo-resist did not adhere to the glass nor stain it but was wiped off with the other residual material.

*Example 5*

By means of the new method a plurality of images of different colors may be formed in a single glass article. For instance a thin film of copper is deposited on a plate of low expansion borosilicate glass and an image is formed therein by applying thereover a coating of a photo-resist comprising bichromated gelatin, exposing the photo-resist through a photographic transparency, developing an image therein while laying bare the copper film comprising the background of the image, and dissolving the bared copper in accordance with the procedure of Example 2. A film of silver is then deposited over the entire surface by evaporation in a vacuum, a coating of the photo-resist is applied thereover and the coating is exposed through a different photographic transparency, an image is developed therein and the silver laid bare by such development is dissolved as in Example 1. Thereafter the glass is coated with ocher and heated in the manner described in Example 2. Such procedure reproduces in the glass in a brown color the image formed in the silver film and in a red color the image formed in the copper film. Where the silver image was superimposed on the copper image the color of the combination is brown to black.

We claim:

1. The method of producing a permanent, two-dimensional, photographic image in glass, which comprises forming directly in contact with a silicate glass article containing an alkali metal oxide a continuous metallic film of at least one metal selected from the group consisting of silver and copper in a pattern corresponding to the desired image, heating the article under oxidizing conditions in air at a temperature and for a time sufficient to oxidize and ionize the metal image and to cause migration of the ions into the glass in exchange for the alkali metal ions therein, and heating the article in a reducing atmosphere to reduce the migrated ions to metallic particles dispersed in and coloring the surface of the glass.

2. The method of producing a permanent, two-dimensional, photographic image in glass, which comprises depositing on the surface of a silicate glass article containing an alkali metal oxide a continuous metallic film of at least one metal selected from the group consisting of silver and copper, covering such film with a coating of a light-sensitive resist capable of being rendered insoluble by exposure to short-wave radiations, exposing a portion of the coating to said radiations in a pattern corresponding to the desired image to render such portion insoluble, dissolving and removing the unexposed portion of the coating to lay bare the metal film thereunder, dissolving and removing the bared metal while leaving intact the metal underlying the insoluble portion of the coating, heating the article under oxidizing conditions in air at a temperature and for a time sufficient to remove the insoluble portion of the coating and to oxidize and ionize the underlying metal and to cause migration of the ions into the glass in exchange for the alkali metal ions therein, and heating the article in a reducing atmosphere to reduce the migrated ions to metallic particles dispersed in and coloring the surface of the glass.

3. The method of claim 2 in which the metallic film consists of silver.

4. The method of claim 2 in which the metallic film consists of copper.

5. The method of claim 2 in which the said article is heated under oxidizing conditions in air containing up to 25% by volume of $SO_2$.

6. The method of claim 2 in which the reducing atmosphere contains a gas selected from the class consisting of hydrogen, carbon monoxide, and methane.

7. The method of claim 6 in which the gas is composed of 8% hydrogen and 92% nitrogen.

8. The method of claim 2 in which a layer of ocher is applied over at least the insoluble portion of the coating before the article is heated.

9. The method of claim 8 in which the layer contains a sulfate selected from the group consisting of ferric sulfate, ferrous sulfate and aluminum sulfate.

10. The method of producing a permanent, two-dimensional, photographic image in glass, which comprises applying to the surface of a silicate glass containing an alkali metal oxide a coating of a light-sensitive resist capable of being rendered insoluble by exposure to short-wave radiations, exposing a portion of the coating to said radiations in a pattern corresponding to the reverse of the desired image to render such portion insoluble, dissolving and removing the unexposed portion of the coating to lay bare the glass thereunder, depositing uniformly on the bared glass and over the residual portion of the light-sensitive resist a continuous metallic film of at least one metal selected from the group consisting of silver and copper, heating the glass under oxidizing conditions in air at a temperature and for a time sufficient to remove the residual portion of the coating together with the metal thereover and to oxidize and ionize the metal which is in contact with the glass and to cause migration of the ions into the glass, and heating the glass in a reducing atmosphere to reduce the migrated ions to metallic particles dispersed in and coloring the surface of glass.

11. The method of claim 10 in which the metallic film consists of silver.

12. The method of claim 10 in which the metallic film consists of copper.

13. The method of claim 10 in which the said article is heated under oxidizing conditions in air containing up to 25% by volume of $SO_2$.

14. The method of claim 10 in which the reducing atmosphere contains a gas selected from the class consisting of hydrogen, carbon monoxide, and methane.

15. The method of claim 14 in which the reducing atmosphere is composed of 8% hydrogen and 92% nitrogen.

16. The method of claim 10 in which a layer of ocher containing ferrous sulfide is applied over the metal film before the glass is heated.

References Cited in the file of this patent

UNITED STATES PATENTS

| Number | Name | Date |
|---|---|---|
| 1,884,665 | Greiner | Oct. 25, 1932 |
| 1,994,483 | Ott | Mar. 19, 1935 |
| 2,233,622 | Lytle | Mar. 4, 1941 |
| 2,279,567 | Holman | Apr. 14, 1942 |
| 2,357,913 | Sigford | Sept. 12, 1944 |
| 2,399,799 | Guellich | May 7, 1946 |
| 2,435,889 | Kerridge | Feb. 10, 1948 |
| 2,447,836 | Beeber et al. | Aug. 24, 1948 |
| 2,628,927 | Colbert et al. | Feb. 17, 1953 |
| 2,649,387 | Parsons et al. | Aug. 18, 1953 |
| 2,659,665 | Parsons et al. | Nov. 17, 1953 |
| 2,732,298 | Stookey | Jan. 24, 1956 |

OTHER REFERENCES

Levy et al.: "The Sylvania Technologist," July 1953, pages 60–63.

UNITED STATES PATENT OFFICE
CERTIFICATE OF CORRECTION

Patent No. 2,904,432                                September 15, 1959

Howard G. Ross et al

It is hereby certified that error appears in the printed specification of the above numbered patent requiring correction and that the said Letters Patent should read as corrected below.

Column 3, lines 37 and 38, strike out "of photo-resist in the conventional manner by exposing the coating"; column 4, line 34, for "referable" read -- preferable --.

Signed and sealed this 29th day of March 1960.

(SEAL)
Attest:

KARL H. AXLINE                                             ROBERT C. WATSON
Attesting Officer                                         Commissioner of Patents